July 11, 1950 J. KUPERUS 2,514,878
ELECTRON DISCHARGE TUBE ALIGNMENT
MEANS AND METHOD OF ALIGNING
Filed May 7, 1948

*INVENTOR.*
JAN KUPERUS
BY Wenderoth, Lind & Ponack
ATTORNEYS

Patented July 11, 1950

2,514,878

UNITED STATES PATENT OFFICE 2,514,878

ELECTRON DISCHARGE TUBE ALIGNMENT MEANS AND METHOD OF ALIGNING

Jan Kuperus, Eindhoven, Netherlands, assignor to Hartford National Bank and Trust Company, Hartford, Conn., as trustee Application May 7, 1948, Serial No. 25,658
In the Netherlands June 12, 1947

5 Claims. (Cl. 250—141)

In the manufacture of electron-beam tubes the image of which is to be projected on a viewing screen by means of an optical system, it is vital that the electrode system should occupy the correct position with respect to the fluorescent screen. In television tubes this fluorescent screen does usually not exceed 5 to 10 cms., so that even a small discrepancy may cause an incorrect position of the projection area commanded by the beam.

In order to obtain an image which is sharp all over, the inner wall of the screen, which is usually arched, is given an optically correct shape. As a rule this wall is formed as a separate part in a mould, usually ground over and subsequently sealed to the remaining wall of the tube. This separate part which comprises the screen wall and a laterally projecting or standing sealing rim is called the window. It is difficult for the electrode-system to be properly positioned with respect to the inner wall of the window, since it is impossible for measuring tools to rest on the screen. As soon as the window has been sealed, the projection surface of the tube is, as it were, out of reach.

The invention concerns a method which permits the screen to be correctly arranged with respect to the axis of the tube determined by the electrode-system. At the same time this method has the advantage that the tube can easily be given a correct position with respect to the projecting optical system.

According to the invention the correct position of the window with respect to the electrode system is ensured by orienting this system with respect to a ledge which is provided at the periphery of the window and is in a definite geometrical relation with respect to the axis of the window. Owing to the position of this ledge which may either consist of a circular rim or recess or of one or more projections or recesses, the position of the axis of the window is determined so that it can be caused to coincide with the axis of the electrode-system.

Furthermore the invention relates to an apparatus comprising an electron-beam tube and an optical system by means of which the image on the screen of the tube is projected on a projection screen. In this apparatus the tube, in the correct position of its axis with respect to the optical system, rests with the ledge on a fixed seat.

In such an apparatus the ledge forming part of the tube according to the invention, may at the same time serve as a fixture for the tube. This yields the advantage that comparatively intricate devices for maintaining the tube, such as are used in known television apparatus to permit the tube to be displaced in any desired manner for obtaining a correct setting, can be dispensed with. According to the invention the window of the tube may be secured to a support and the remaining part, to which the coils for deflecting and focussing of the beam are secured at the exterior and the electrode-system is secured at the inside, may be supported by the window.

In order that the invention may be clearly understood and readily carried into effect it will now be described more fully with reference to the accompanying diagrammatic drawing, given by way of example. In this drawing Fig. 1 is a fragmentary section of an electron-beam tube in which the method according to the invention may be used, before sealing the window.

Figures 1, 2:
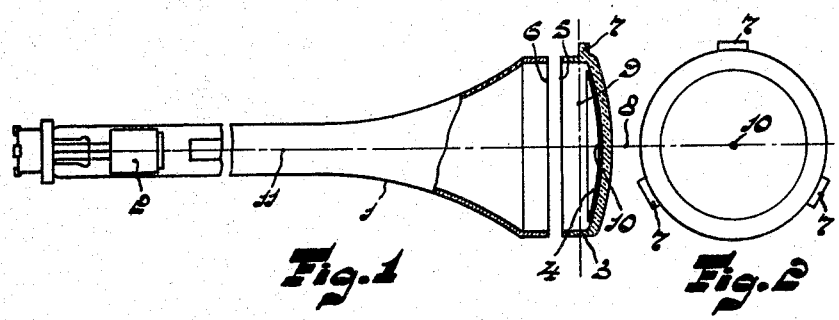
Fig. 2 represents the same tube viewed in the gate in the direction of the axis.

In Fig. 1 the reference numeral 1 denotes the portion of the tube which comprises the electrode-system 2 and about which the coils are subsequently provided if the electron-beam is deflected or focussed magnetically. The part 3 is the window which is internally coated with a fluorescent material. The distance of the source of electrons from the screen may, for instance, be 20 cms. with a window diameter of 6.5 cms.

After the fluorescent layer has been provided the edge 5 of the window 3 is placed against the edge 6 of the portion 1 and sealed thereto. During this treatment the screen should be exactly oriented with respect to the electrode-system. The latter is visible from without. The concave projection screen is less well visible and, after sealing and cooling, there is a great risk that the screen occupies a false position or that the axis of the tube does not extend through the center of the screen.

According to the invention a ledge is provided at the periphery of the base. This ledge consists of a number of projections in the form of lugs 7. They determine the position of the axis 8 of the concave surface 4 and extend, for instance, in a plane 9 at right angles to this axis.

If the moulding operation alone is insufficient for obtaining the exact shape, the surface 4 is ground over to the optically required degree. At the same time the lugs 7 may be ground over so that the point of intersection of the plane 9 which plane is determined by the lugs and the axis 8, is constantly at the same distance from the center 10 of the screen. Good results are also obtainable without the last-mentioned operation, provided that the axis 8 constantly extends at right angles to the plane 9, or at least occupies the same position with respect to the spatial figure determined by the three lugs.

On sealing the window 3 to the tube 1, the axis 11 of the electrode system may be brought in alignment with the axis 8 by resting the measuring tool on the lugs 7.

Figures 3, 4:
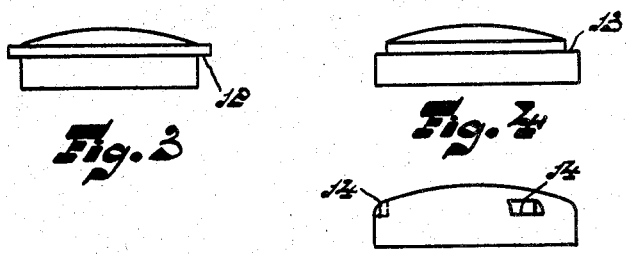
Figs. 3, 4 and 5 are side views of windows and illustrate three examples of the manner in which the ledge may be formed.

With the window shown in Figure 3 a circular rim 12 acts as a ledge. Tubes are known in which the window exhibits a laterally projecting rim, but the latter has not for its purpose to view the position of the screen from without and is not used to this end.

Figure 5:
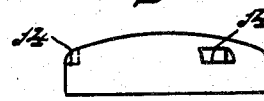

Of course, it is also possible for the front surface of the lugs 7 or of the rim 12 to be used as a contact surface. With the windows shown in Figs. 4 and 5 the contact surface is located on the side. In Fig. 4 the rim 13 provides the contact surface and in Fig. 5 the latter is provided by recesses 14.

Figure 6:
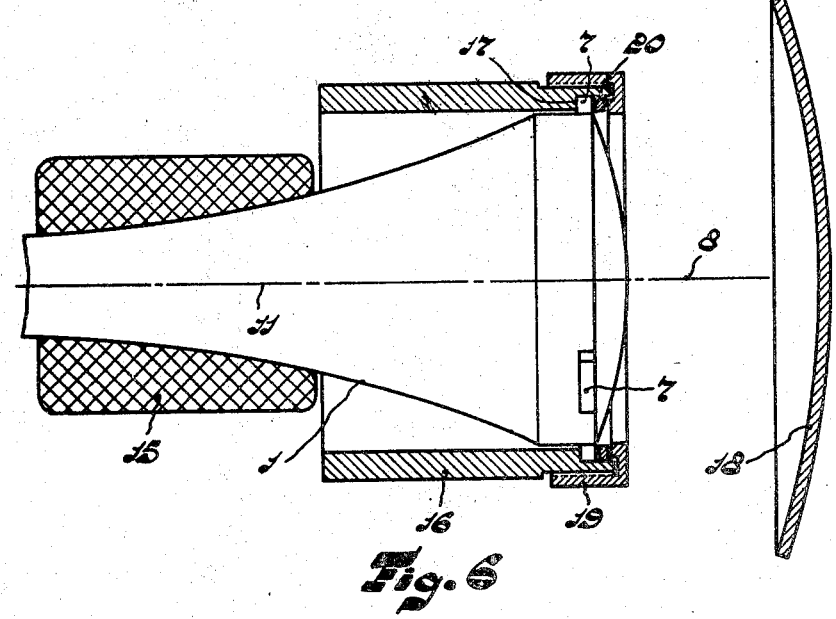
Fig. 6 is a detail view of an apparatus according to the invention.

In Fig. 6 the reference numeral 1 denotes the electron-beam tube carrying a set of coils 15 for deflection and focussing. The tube is mounted in an annular support 16 represented in section. This support exhibits a rabbet 17 which serves as a seat for the lugs 7 of the tube. By grinding the lugs to measure also at their periphery, in processing the screen surface, the circumscribed circle of the lugs can be made to extend concentrically with the screen and the lugs can be made to fit closely in the ring 16.

The reference numeral 18 designates a mirror objective which should be imagined to be arranged at a greater distance from the tube than is indicated in the drawing. By means of this mirror (instead thereof it is also possible to use a lens system) the image of the screen is thrown on a projection screen (not represented).

The ring 16 if located in such manner with respect to the objective that, if the tube rests with its ledge on the seat 17, the axis of the screen occupies the position required for a sharp projection of the image. If a fixed relation is maintained between the plane 9 and the point 10 (Fig. 1) the ring 16 may previously be arranged in such manner that the screen, when the lugs rest on the seat 17, is automatically at a correct distance from the objective. If this is not the case it is only necessary for the seat to be adjustable in an axial direction, lateral displacement and turning of the axis being no longer necessary for a correct setting.

In the embodiment represented the ring 16 serves not only for a correct setting, but also for securing the tube. To this end the ring has screwed to it a cap nut 19 by which a set 20 comprising two metal rings and an intermediate rubber ring is pressed against the front of the lugs 7, so that the latter are clamped on the seat. Any difference in thickness of the three lugs is compensated by the elastic intermediate ring. For mounting the tube in the apparatus it is introduced into the support from the front side thereof. If the contact surface is located at the front side of the window, such as with the windows shown in Figures 4 and 5, the support is preferably constructed in a manner such that the tube is introduced into the support from the rear thereof.

What I claim is:

1. An electric discharge tube for image projection systems comprising a body portion, an end face window portion having an optical axis and sealed to said body portion at an outer periphery of said window portion, an electrode system positioned in the said body portion and remote from said window portion and having a given axis the extension of which coincides with the said optical axis of the said window portion, and alignment means including surface means on the outer periphery of the said window portion adjacent said seal at said body portion, said surface means having a definite geometrical relation with the said optical axis of the said window portion and the said extension of the given axis of the said electrode system, and on which surface means alignment tools may be positioned to locate the said optical axis of the said window portion and the said given axis of the said electrode system in coincidence.

2. An electric discharge tube for image projection systems comprising a body portion, an end face window portion having an optical axis and sealed to said body portion at an outer periphery of said window portion, an electrode system positioned in the said body portion remote from said window portion and having a given axis the extension of which coincides with the said optical axis of the said window portion, and a ledge member on the said outer periphery of the said window portion adjacent said seal at said body portion, said ledge member having a surface which extends in a plane substantially normal to the said optical axis of the said window portion and the said extension of the given axis of the said electrode system and on which surface alignment tools may be positioned to locate the said optical axis of the said window portion and the said given axis of the said electrode system in coincidence.

3. An electric discharge tube for image projection systems comprising a body portion, an end face window portion having an optical axis and sealed to said body portion at an outer periphery of said window portion, an electrode system positioned in the said body portion from said window portion and having a given axis the extension of which coincides with the said optical axis of the said window portion, and spaced projections on the said outer periphery of the said window portion adjacent said seal at said body portion, said projections having surfaces which extend in a given plane substantially normal to the said optical axis of the said window portion and on which surfaces alignment tools may be positioned to locate the said optical axis of the said window portion and the said given axis of the said electrode system in coincidence.

4. An electric discharge tube for image projection systems comprising a body portion, an end face window portion having an optical axis and sealed to said body portion at an outer periphery of said window portion, an electrode system positioned in the said body portion and remote from said window portion and having a given axis the extension of which coincides with the said optical axis of the said window portion, and a rim member on the said outer periphery of the said window portion and having a recessed surface therein adjacent said seal at said body portion, the said recessed surface being in definite geometrical relation with the said optical axis of the said end face window portion and on which recessed surface alignment tools may be positioned to locate the said optical axis of the said window portion and the given axis of the said electrode system in coincidence.

5. A method of aligning components of an electric discharge tube for use in image projection systems, which tube comprises a body portion enclosing an electrode system having an axis and an end face window portion having an optical axis and provided with ledge means on the outer periphery of the said window for aligning the axis of the said electrode system with the optical axis of the said window portion, the said ledge means having a given surface thereof in definite geometrical relation with the said optical axis, comprising the steps of positioning the said body portion, orienting the said end face window portion adjacent the said body portion, aligning the axis of the said electrode system with the said optical axis of the said window portion with alignment tools placed on the said given surface of the said ledge means, and sealing the said window portion to the said body portion while the said axes are aligned.

JAN KUPERUS.

REFERENCES CITED

The following references are of record in the file of this patent:

UNITED STATES PATENTS

| Number | Name | Date |
|---|---|---|
| 2,167,431 | Bowie | July 25, 1939 |
| 2,178,826 | Bowie | Nov. 7, 1939 |
| 2,189,261 | Bowie | Feb. 6, 1940 |
| 2,232,098 | Deichman | Feb. 18, 1941 |
| 2,281,637 | Sukumlyn | May 5, 1942 |
| 2,293,529 | Bedford | Aug. 18, 1942 |

FOREIGN PATENTS

| Number | Country | Date |
|---|---|---|
| 23,156 | Australia | June 20, 1935 |